United States Patent [19]

Tisdale et al.

[11] 4,157,023

[45] Jun. 5, 1979

[54] APPARATUS AND METHOD FOR LAYING PIPELINES

[75] Inventors: Benjamin C. Tisdale, River Ridge, La.; William B. Nicholson, Corpus Christi, Tex.

[73] Assignee: Martech International, Inc., Houston, Tex.

[21] Appl. No.: 841,998

[22] Filed: Oct. 14, 1977

[51] Int. Cl.² .................... B21D 3/02; F16L 1/00
[52] U.S. Cl. ........................ 72/161; 72/183; 405/168
[58] Field of Search ............. 72/160, 164, 183, 146; 61/107, 109

[56] References Cited

U.S. PATENT DOCUMENTS

| 3,765,210 | 10/1973 | Lemper | 72/164 |
| 3,855,835 | 12/1974 | Tisdale et al. | 72/183 |
| 3,872,680 | 3/1975 | Nicholson et al. | 61/109 |
| 3,982,402 | 9/1976 | Lang et al. | 72/161 X |

Primary Examiner—Milton S. Mehr
Attorney, Agent, or Firm—Bernard A. Reiter

[57] ABSTRACT

A reel and bending apparatus and method for laying pipelines from a floating vessel on the floor of a body of water in which the pipeline is capable of being unreeled from either the top or bottom of the reel and then translated through two pair of independently housed horizontally disposed rollers working in conjunction with the reel for straightening the pipe in the vertical plane.

13 Claims, 6 Drawing Figures

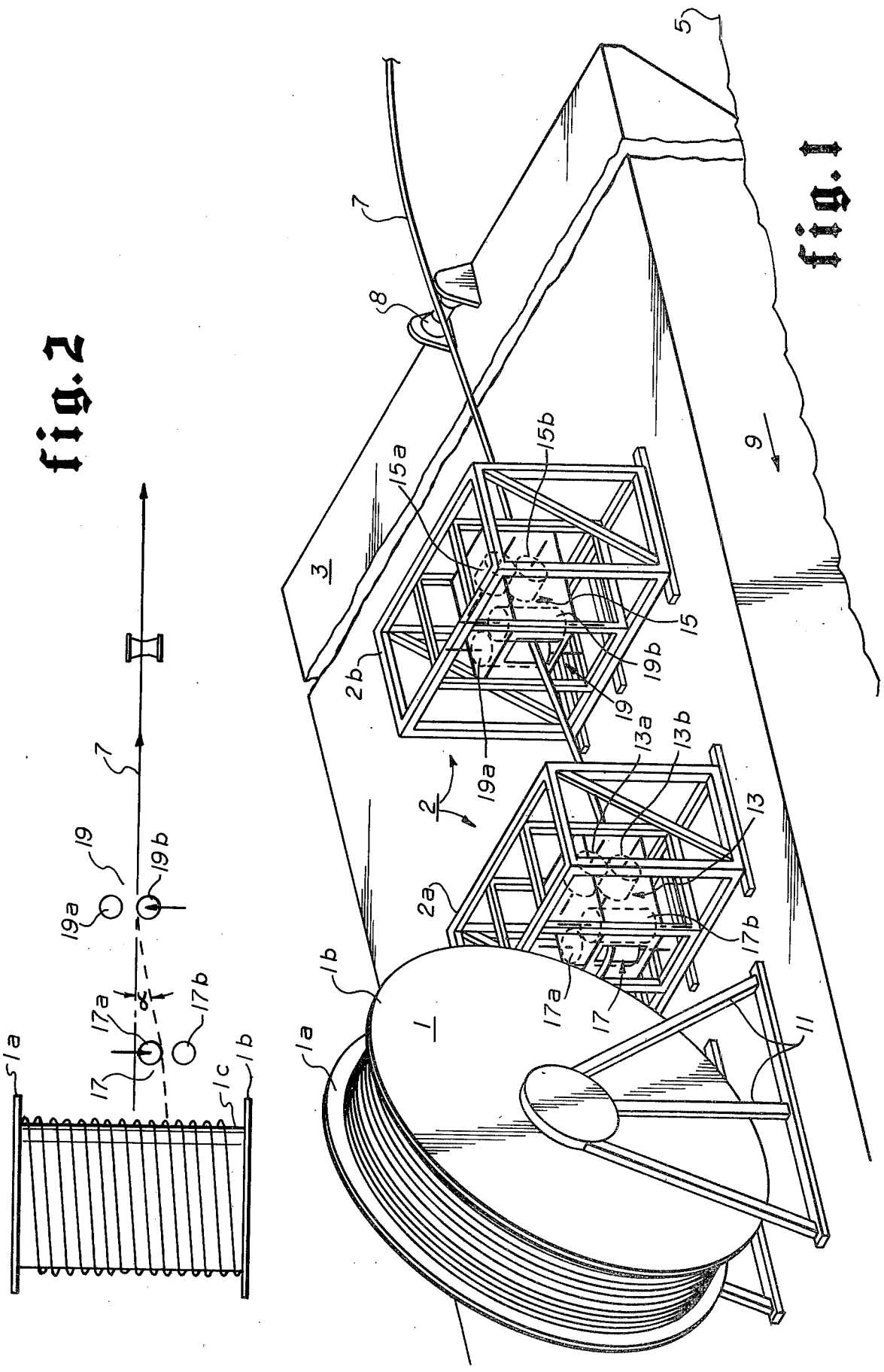

APPARATUS AND METHOD FOR LAYING PIPELINES

FIELD OF THE INVENTION

This invention relates generally to an apparatus and method for laying pipelines, and more particularly for laying pipelines on the floor of a body of water from a reel on the deck of a vessel wherein the pipeline is first wound upon the spool of the reel and later played therefrom into the water as the vessel progresses forwardly.

The relatively recent recognition of an energy shortage has emphasized the need for accelerated hydrocarbon exploration in numerous areas of the world, with particular importance being given to the retrieval of these natural resources from offshore locations. This increased exploration and retrieval of oil and gas from beneath various bodies of water has necessitated new and improved equipment and methods for transporting or moving the petroleum, once found, to storage and/or processing facilities. It is with respect to the transportation of this markedly increased quantity of petroleum that the present invention suggests and teaches an apparatus consisting of a reel and bending mechanism to be mounted on a vessel for continuously laying an underwater pipeline from a site offshore to the storage or processing facility.

U.S. Pat. Nos. 3,855,835 and 3,747,356, for example, typically disclose teachings which are representative of the apparatus heretofore used for laying underwater pipeline wound on a reel mounted on a floating vessel. In these arrangements, a pipeline comprising a plurality of joined pipe sections is wound on a rotatable reel and the vessel is then moved in a predetermined direction while the pipeline is unwound from the reel and lowered to the bottom of the body of water. While the pipeline leaves the reel, but before it enters the water, it is moved through a plurality of rollers so positioned and arranged as to reverse the bend which had been earlier imparted to the pipeline in order to wind it on the reel.

Heretofore, the physical design of the reel and bending apparatus on vessels has generally been somewhat limited in that it is not readily adaptable to various operational conditions such as the depth of water and dimensional characteristics of the pipe. For example, pipe characterized by large diameter and thick walls is not easily bent toward an acute angle because the pairs of rollers applying forces to the pipeline would have to be disposed closely to one another and great forces applied to them. Also, the reeling and bending apparatuses designed heretofore have generally been able to accommodate reeling and unreeling either from the top or bottom of the reel, but not from both, this generally as a consequence of the physical design and location of the bending apparatuses on the deck. Since it is generally desirable to unreel pipeline from the top of the reel when laying in deep water and from the bottom when laying in shallow water, all being somewhat dependent on the characteristics of the pipe though, it is disadvantageous to not be able to do both from the same vessel and apparatus design.

It is commonly known that a straight and rigid body may not be bent intermediate its ends except upon the application of at least three forces, one at each end and one in the middle. This principle has manifest itself in the utilization of three-pair roller systems in the pipe-bending art and although two-roller systems have been devised, none are characterized by a satisfactory flexibility of movement on the deck of the vessel, nor teach a method for enabling the laying of a wide variety of pipeline diameters and thicknesses, optionally from the top or bottom of the reel. It is, therefore, with respect to the overall shortcomings described above that the present invention discloses an apparatus and teaches a method for using such apparatus as to enable an expeditious and continuous laying of a wide variety of pipe on the floor of a body of water.

A further feature and advantage of the invention resides in a reel and pipe-bending apparatus and method enabling unreeling of a broad variety of pipeline from either the top or the bottom of the reel, and subsequently permitting the continuous bending thereafter, thus better enabling laying operations in deep or shallow water.

A still further feature and advantage of the invention resides in the disclosure of a structure and method of use of a two-pair roller system, each pair being independently mounted on integral and separate supporting structures and movable with respect to the other and to the reel, thereby enabling reduction in the overall bending forces necessary by substantially increasing the moment arm between the fulcrum rollers and the bending forces.

Yet another feature and advantage resides in a bending apparatus in which the reel itself applies the bending moment when pipe is reeled.

Still another advantage resides in a method for maintaining tension in the pipe upon reeling so as to achieve a tightly loaded pipe, thus achieving maximum pipe length on the reel preparatory to laying.

These and numerous other features and advantages of the invention will become more readily apparent upon a reading of the following detailed description, claims and drawings, wherein like numerals denote like parts in the several views and wherein:

DESCRIPTION OF THE DRAWINGS

FIG. 1 is an isometric view showing the relationship of the reel and bending apparatus of the invention in exemplary form.

FIG. 2 is a schematic top view illustration of the reel and bending apparatus of the invention as shown in FIG. 1.

DETAILED DESCRIPTION

Figure 3:
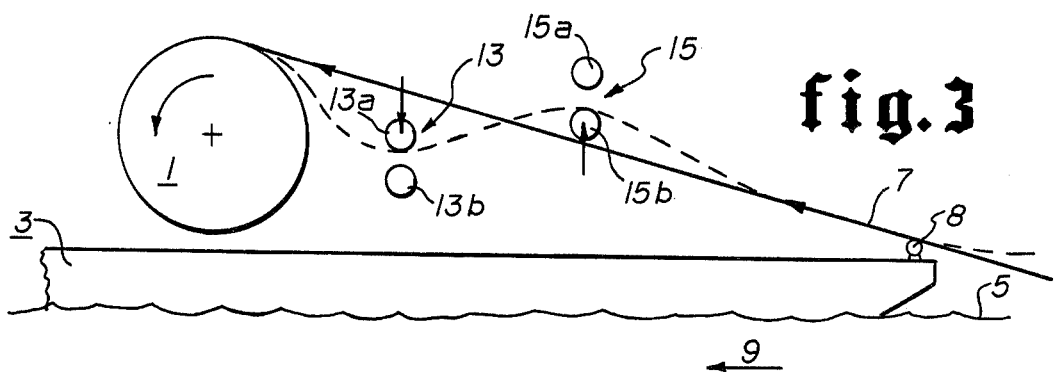
FIG. 3 is a schematic side elevation view of the apparatus of the present invention as it winds pipeline onto the top of the reel.

With reference now to FIG. 1 there is shown, in exemplary form, an isometric illustration of the reel 1 and bending apparatus 2 mounted on a pipe-laying barge 3. The barge 3 is generally intended to float on a body of water 5 beneath which there exists a floor (not shown). The apparatus is shown laying a continuous pipeline 7 along the floor of the body of water as the vessel 3 moves forwardly, as shown at 9 in its predetermined direction. Generally, before the pipe-laying operation has begun, the pipeline 7 has been welded from sections into a single continuous line at the dock and thereat bent and wound on the reel as described hereafter.

Typically, prior to laying of the pipeline on the floor of the body of water the pipeline is unwound from the reel 1 and reverse bent through the bending apparatuses 13, 15, 17 and 19, also described hereinafter.

As shown in FIG. 1 the reel 1 includes a cylindrical drum or spool having end flanges 1(a) and 1(b). The drum is supported on an axle which is in itself mounted on framework 11. The drum may be rotated either clockwise or counterclockwise and is powered by a drive means and interconnected gearing mechanism (not shown) so as to enable reeling and unreeling from either the top or bottom of the reel.

The apparatus for bending the pipe is characterized by a pair of independent housing assemblies 2(a) and 2(b), each of which contain multiple roller systems for applying forces in a vertical plane to the pipeline. Mounted in housing 2(a) is first roller means 13 while housing 2(b) contains second roller means 15. The first and second roller means each include respectively an upper roller 13(a), 15(a) and a lower roller 13(b), 15(b). The upper and lower rollers 13(a), 13(b) and 15(a) and 15(b) are mounted horizontally such that a predetermined spatial distance exists therebetween and through which the pipeline is intended to pass. Each of the upper and lower rollers in both housings are adjustably movable in the vertical plane, independently of movement of the housing in which they are contained. Also disposed within the housing frames 2(a), 2(b) are third roller means 17 and fourth roller means 19 respectively for applying forces to the pipeline in a horizontal plane. Each of these roller means includes a right and left bending roller 17(a), 17(b) and 19(a), 19(b), respectively. The third and fourth roller means and their respective right and left bending rollers are each capable of movement vertically, and laterally in a direction parallel to the axis of the reel. Thus, it will be apparent that the four sets of roller means are oriented to receive pipeline and to bend the pipeline within either the vertical or horizontal plane, separately or simultaneously.

Of significance in the above apparatus is the fact that the bending of the pipeline is accomplished, for example, in the vertical plane, by just two pair of roller means. Bending of the pipe in the horizontal plane is likewise accomplished by just two pair of roller means, that is the third roller means 17 and the fourth roller means 19. It is particularly noted that this system and the physical arrangement and construction of the two housings 2(a) and 2(b) with respect to the reel 1 allows the pipeline to be wound and bent upon the reel at either the bottom or the top and unwound similarly therefrom. Upon unwinding, the pipeline is reverse bent in the vertical plane by translation through just two pairs of roller means (13, 15). Bending and reverse bending of the pipeline is accomplished therefore by holding the pipeline in tension between the reel and the rollers of housing 2(b), the pipeline presenting an essentially straight line between these points. Vertical and lateral movement of housing 2(a) and/or of the rollers therein with reference to this line produces bending. Due to the total structural independence of the two housings 2(a), 2(b) with respect to one another, the roller systems therein are movable to any position on the deck of the barge, allowing substantial distances between the two housings 2(a), 2(b) even. This, for example, enables movement of housing 2(a) to a position substantially half way intermediate the distance between the reel and the housing 2(b) which, in itself, may be moved proximate to the stern of the vessel in order to thereby increase the moment arms (described hereafter) of the force to be applied to the pipeline. Thus, relatively nominal forces may, if desirable, be applied by the bending rollers. This is particularly advantageous when relatively wide diameter, relatively thick pipeline is being wound, unwound and bent, since lower forces may be used by increasing the bending moment. Conversely, when relatively small diameter, thin pipeline is being unwound from the reel, it may become desirable to move the two housings 2(a), 2(b) up, relatively close to the reel. The relative positions of the two housings 2(a), 2(b) to each other and to the reel will therefore be largely influenced by the diameter of the pipeline being bent and laid, the thickness of the pipe, the modulus of elasticity, and the depth of water into which the pipe is being deployed. It is this latter factor, that is the water depth, that may largely influence the decision to unreel the pipeline from either the top or the bottom of the reel. Pipe diameter and thickness are also considered however. Generally, when laying pipelines in shallow water it may be more desirable to unreel the pipeline from the bottom of the reel since it is unlikely that the angle of bend, that is the included angle of pipe bend ($\beta$), (see FIG. 5 for example) will impose excessive forces on the pipe. By contrast, when pipe is laid into deeper waters, the angle of bend ($\beta$) of the pipe may become greater and in order to minimize the bending angle ($\beta$) and hence the forces borne by the pipe, it may become desirable to unreel the pipe from the top or upper portion of the reel. Thus, although the decision to play the pipe from the top or bottom of the reel may be influenced by a variety of factors such as those set forth hereinabove, the ability to have the option of one or the other constitutes a marked advantage over a reel and bending apparatus on a barge which essentially provides for unreeling of the pipeline from either the top or the bottom exclusively, and the design and physical arrangement of a bending apparatus on a vessel which allows for separate and independent movement of the respective bending means over a broad range of distances and positions, including from adjacent the reel to the stern, enables the actual playing of the pipeline from the top or bottom of the reel by allowing for larger or smaller bending arcs. With such an arrangement there is provided a reel and bending apparatus on a vessel which is capable of operating over a wide range of water depths and pipeline diameters, thus providing for a flexibility and versatility in operation not heretofore known.

In operation, and as briefly explained above, the aforementioned first 13 and second 15 roller means do not in themselves produce bending of the pipeline. Bend (winding) to the pipe is imparted by the reel 1. More specifically, in the bending 2(a) means there exists the upper and lower rollers, either of which may constitute the fulcrum roller depending upon whether or not the pipe is being wound or unwound from the reel. In bending onto the top or upper portion, the upper roller 13(a) of first roller means 13 will act as a tension producing force producing a snubbing effect on the pipe as the reel 1 moves with respect thereto, see FIG. 1. The pipe thus is bent tightly to the reel spool arc by the reel rotation itself. Pipe is not therefore prebent. For example, were the pipeline to traverse a path between rollers 15(a) and 15(b), there will be no bending imparted to the pipeline if the path thereof extends unaltered in a straight line between these two points. More specifically, bending of the pipeline is accomplished by utilization of the reel and the first roller 13(a) is operated in conjunction with the reel 1 by maintaining a proper tension in the pipe as it winds to the reel. Other systems using, for example, three pairs of bending rollers cannot effectively accomplish a bending of the pipe onto the reel because they necessarily attempt to prebend the pipe and to do so precludes travel of the bent section through the third roller means and thereafter onto the reel itself. Thus, bending of the pipe, as shown in FIG. 3, as it is being wound onto the top of the reel, is accomplished by the reel and roller 13(a) of the first roller means when said roller is moved into position with its circumferential surface disposed below the path of travel of the pipeline in an imaginary straight line from the contact point 8 on the stern to the last lap at the top of the reel (See FIG. 3). In this manner the pipeline curvature is essentially produced as the pipeline is wrapped onto the reel which is moving in a counterclockwise direction. This principle of using the reel itself as the bending force and the first roller means as the fulcrum for initiating tension or snubbing action in the pipe is illustrated further in the drawings of FIG. 5, wherein loading of the pipe from the bottom of the reel is shown. As explained above, the determination of whether or not to lay pipe from the top or bottom of the reel is influenced by characteristics of the pipe and the water depth, and likewise, the relative position of the first and second roller means on the deck of the vessel are influenced similarly.

With further reference now to FIG. 3, there is shown a vessel 3 having a reel 1 and first and second roller means 13, 15, respectively. The roller means are illustrated schematically to show the relative position of the pipeline 7 when it is being loaded onto the reel after respective sections are welded together. In so doing, the pipeline 7 would normally contact the interior circumferential surface of lower roller member 15(b) and move in a straight line to the point of contact with the reel 1 were it not for the displaced position of upper roller 13(a) of the first roller means 13. Such upper roller has its lower circumferential surface disposed substantially below the reel surface so as to apply a downwardly directed force against the pipeline as it passes between the rollers of the first roller means 13. In effect, the lower roller 13(b) does not necessarily even contact the pipeline as it passes.

Figure 4:
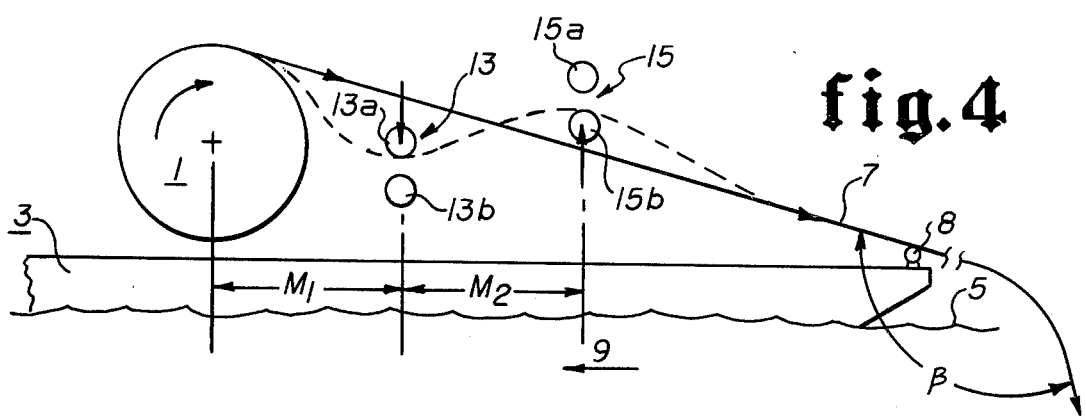
FIG. 4 is a schematic side elevation of the apparatus of the present invention as shown in FIG. 3 but with the pipeline thereof being unwound therefrom during the laying operation.

With respect to FIG. 4, there is schematically illustrated the circumstances in which the pipeline of FIG. 3 is unwound so that it is necessary to impart a reverse bend to the pipeline in order to accomplish a straightening thereof. Here, the upper roller 13(a) of the first roller means is positioned to apply a downwardly directed force against the pipeline as it passes therethrough when the reel is moving in a clockwise direction. Simultaneously, the lower roller 13(b) of the first roller means 13 is substantially inactive, and does not necessarily contact the pipe. In this circumstance, it may be noted that the circumference of the upper roller 13(a) of the first roller means 13 must reside substantially below the height of an imaginary straight line drawn between the point at which the pipeline is unwrapping from the reel and the top of the lower roller 15(b). Thus, the contact point of the straight line on lower roller 15(b) and the point at which such straight line contacts the reel, that is the point of unwrapping, constitutes the two fixed points between which the pipeline tension must be maintained in order for the fulcrum or upper roller 13(a) to produce unbending of the bent pipe. It will be recognized that the relative distances M1 and M2 in FIG. 4 will determine the relative degree of bending to be imparted to the pipeline. Clearly, in order to easily accomplish this bend, it may be desirable to increase distances M1 or M2 as much as possible within the limits of the arc curvature required. The distances M1 and M2 act as approximate moment arms influencing the amount of force to be borne by the fulcrum roller 13(b) of the first roller means 13 and either the upper and lower rollers 15(a), 15(b) of the second roller means 15.

Figure 5:
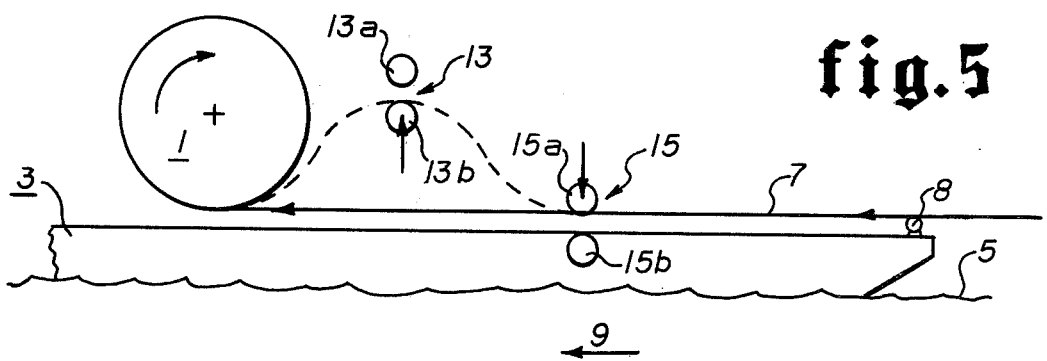
FIG. 5 is a schematic side elevation view of the apparatus of the invention as it winds pipeline onto the reel at the bottom thereof.
Figure 6:
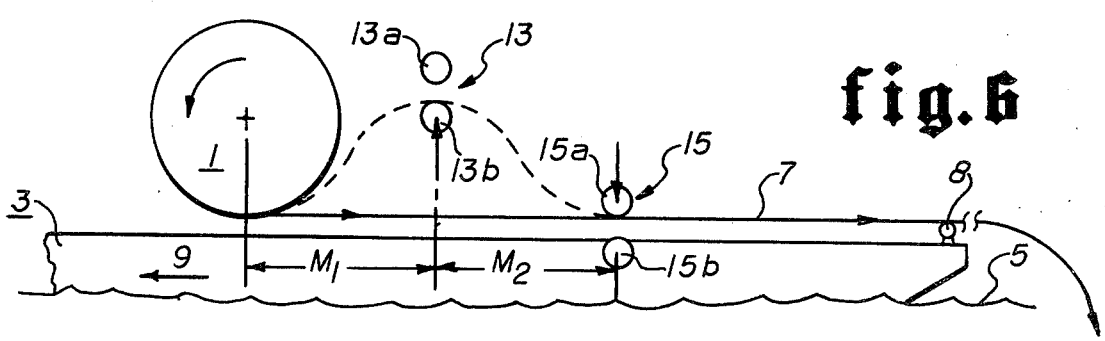
FIG. 6 is a schematic side elevation view of the apparatus of the present invention as it unwinds pipeline, preparatory to laying, from the bottom of the reel.

With respect to FIGS. 5 and 6, there is shown, respectively, the loading of a pipeline onto the bottom of the reel and the unloading therefrom. In FIG. 5 the pipeline is moved, through rotation of the powered reel 1, in a counterclockwise direction between the upper and lower rollers of the second roller means 15 with the upper roller 15(a) producing a downwardly directed force such that the pipeline rests across the circumference thereof. The lower roller 15(b) is not necessarily effectively acting on the pipeline at this point. A straight line, however, between the contact point of the pipeline on roller 15(a) and the point at which said pipe first contacts the reel is the line above which the circumference of the fulcrum roller 13(b) must substantially reside. Positioning of the fulcrum roller 13(b) substantially above said line, determined by the aforementioned two fixed points, inherently produces a tension in the pipeline sufficient to bend and wrap it.

In FIG. 6, the pipeline loaded onto the reel 1 of FIG. 5 is unreeled from the bottom thereof. In this situation the bending forces applied requires that the fulcrum roller 13(b) be disposed above the straight line extending between upper roller 15(a) and the contact point on the reel of the pipeline lap that is being unwound. Thus, the upper roller 13(a) of the first roller means is substantially inactive as is the lower roller 15(b) of the second roller means. It will again be recognized, however, that the pipeline 7 will reside in tension as it is being unwound from the reel 1 in order to produce a reverse bending as shown by the dotted line in FIG. 6. The relative distance of the reverse bending rollers 13(a) and 13(b) from the aforementioned straight line will depend on the degree of reverse arc being imparted to the pipe. The moment arms M1 and M2 will likewise be so governed.

As the pipeline is wound onto the reel 1, a sequence of laps are placed upon the reel such that a helical bend is imparted to the pipe, see FIG. 2. This is accomplished by lateral movement of the third and fourth roller means 17, 19, respectively. The third roller means comprises respectively the right bending roller 17(a) and the left bending roller 17(b) while the fourth roller means comprises the right bending roller 19(a) and the left bending roller 19(b). In FIG. 2 there is shown the helically wound pipeline 7 being unwound from the reel 1 and wherein the third roller means are movably positioned within their frame so as to reverse bend the residual helical bend so as to thus straighten the pipeline in the horizontal plane. Specifically, it will be noted in the plan of FIG. 2 (viewed from the bending means toward the reel) that the pipeline, for purposes of coiling across the spool 1(c) of the reel, has been bent at its contact point with left bending roller 19(b) of the fourth roller means 19 and that the angle of this bend is generally designated as the angle α, that is the angle defined by a line normal to the axis of the reel and extending through the pipeline axis between the fourth roller means and a line running from the bending roller 19(b) which is coincident with the coil of the pipeline portion being unwrapped at the reel, inclusive. Unbending of the residual helical bend in the pipeline caused by the coiling requires that the bending roller 17(a) of the third roller means be disposed to the left of the imaginary line aforedescribed and which is coincident with the wall of the pipeline wrap as shown by the dotted line in FIG. 2. As the pipeline unwraps from the left side of the reel, the third bending means advances progressively from an extreme position wherein the dotted line is at a maximum separation from the hypotenuse of the triangle defined by the angle α, to a position wherein the contacting circumference of the right bending roller is coincident with the axes of the pipeline which is normal to the axis of the reel. And conversely, as the pipeline unwraps from the right side of the reel, when viewed from the bending apparatus, the left bending roller 17(b) becomes the fulcrum roller and it moves progressively toward the right end 1(a) of the reel with the angle α increasing to its maximum as the reel unwinds. It will conversely be recognized that upon winding of the pipeline onto the reel the fulcrum function is performed by the left bending roller 17(b) working in conjunction with the circumferential surface of the right bending roller 19(a) of the fourth roller means 19 and that the principles described hereinabove will be similarly so applied.

Though only a single reel is shown mounted on the barge 9 in the drawings herein, it is apparent that multiple reels could be employed and that such reels could be disposed in a variety of relations to one another, and to a two-roller system as described. Similarly, it may be recognized that the reel and bending apparatus and the principles pertaining thereto herein, and the method of operation disclosed need not be disposed and operated on the deck of the barge and that instead the reel itself may be disposed within the hull or on the hull while the bending apparatuses are disposed within the hull such that the pipeline 7 is played out through the keel rather than over the stern of the barge. It will be obvious that numerous other modifications may be made in the apparatus, and in the method pertaining thereto which has been disclosed herein. The invention is therefore not to be considered limited to the preferred embodiment shown in the drawings, but instead should be interpreted to reside within the scope of the claims appended hereto and recited hereafter.

I claim:

1. In an apparatus for the laying of pipeline on the floor of a body of water and in which the pipeline is first wound onto or unwound from the upper portion of a rotatable reel mounted on a vessel adapted to move on the surface of the body of water as the pipeline is thereafter unreeled therefrom comprising:

a first and second roller means on the vessel having their axes in parallel, each said roller means respectively including an upper roller and a lower roller for selectively contacting the pipeline as the reel rotates, the lower roller of said second roller means being adapted to apply force against the pipeline as it passes thereover while the upper roller of said second roller means is free from the application of loads thereon, the upper roller of said first roller means positioned substantially below a line extending between the rollers of said second roller means to the axis of the pipeline at the point where it first contracts the reel or pipeline wraps thereon to thus snub the pipeline into tension against the reel as it is wound thereonto at the top thereof.

2. In an apparatus for the laying of pipeline on the floor of a body of water and in which the pipeline is first wound or unwound from the lower portion of a rotatable reel mounted on a vessel adapted to move on the surface of the body of water as the pipeline is thereafter reeled therefrom comprising:

a first and second roller means on their vessel having the axes substantially parallel to each other, each of said roller means respectively including an upper and a lower roller for selectively contacting the pipeline as the reel rotates, the upper roller of said second roller means being positioned to apply a downwardly directed force against the pipeline as it passes thereover while the lower roller of said second roller means is free from the application of loads thereon, the lower roller of said first roller means positioned substantially above a line extending between the rollers of said second roller means to the axis of the pipeline at the point where it first contacts the reel or pipeline wraps thereon to thus snub the pipeline into tension against the reel as it is wound thereonto at the bottom thereof, said first and second roller means being alternately positioned to wind or unwind pipeline from the top of the rotatable reel to thereby provide for pipeline laying in deeper waters and wherein the upper roller of said first roller means is positioned substantially below a line extending between the rollers of said second roller means to the axis of the pipeline at its point of contact with the reel or pipeline wraps thereon.

3. The apparatus for the laying of a pipeline as set forth in claim 1 and further including:

the upper roller of said first roller means being adjustably positioned to apply a downwardly directed force against the pipeline as it passes thereby while said upper roller of said second roller means is free from the application of loads thereon, all while the pipeline is unwinding from the upper portion of the reel so as to produce a continuous tension on the pipeline while being wound on the reel and a reverse bending force when being unwound therefrom.

4. The apparatus of claim 3 wherein said second roller means is independently movable of said first roller means from a position adjacent thereto to a position adjacent the stern of the vessel.

5. The apparatus of claim 3 wherein said first roller means is independently movable of said second roller means up to and adjacent said reel, and is vertically adjustable so as to increase the snubbing tension on the reel.

6. The apparatus of claim 2 wherein the lower roller of said first roller means is adjustably positioned to apply an upwardly directed force against the pipeline as it passes thereby to either variably tension or variably reverse bend the pipeline depending upon its direction of movement while the lower roller of said second roller means is free from the application of loads thereon when the pipeline is being wound or unwound from said lower portion of the reel.

7. The apparatus of claim 6 wherein said second roller means is independently movable of said first roller means from a position adjacent thereto to a position adjacent the vessel stern.

8. The method of claim 6 wherein said first roller means is independently movable of said second roller means up to and adjacent said reel and is vertically adjustable so as to vary the tension in the pipeline adjacent the reel or the angle of reverse bend in the pipeline as it is played from the reel.

9. In combination with a vessel for laying of pipeline beneath the surface of a body of water from a reel mounted thereon and which is rotatable in either the clockwise or counterclockwise direction so as to reel and unreel pipe from either the top or bottom thereof the improvement relating to a tension winding and reverse bending system comprising:
first and second roller means disposed between the reel and the vessel stern for contacting the pipeline and guiding it in a predetermined path as it moves in either a first or second direction,
said first roller means disposed to snub the pipeline into tension position when the pipeline moves in the first direction and to reverse bend the pipeline to a rectilinear configuration when it unwraps from the reel to move in the second direction,
said snubbing tension position of said first roller means being further defined by its location proximate the reel intermediate the second roller means and at a height substantially intermediate the alternate paths of travel between the second roller means and either the top or bottom of the reel.

10. The combination of claim 9 wherein said first roller means and said second roller means are horizontally movable with respect to and independently of one another and of said reel along the length of the vessel from the reel to the stern thereof, each said roller means being vertically adjustable when said pipeline is moving in said second direction, all so as to adjustably control the arc of the pipeline during the reverse bending thereof.

11. The method of loading a pipeline onto a reel and unloading it therefrom while applying reverse bending thereto so as to achieve a substantially rectilinear configuration as the pipeline is played from the stern of a forwardly moving vessel having first and second roller means through which the pipe passes on the deck thereof comprising the steps of:
reeling the pipeline through said roller means and maintaining said first roller means in tension snubbing position adjacent the reel so that the pipe is bent by movement of the reel,
unreeling the pipeline during laying thereof on the floor of the body of water,
reverse bending the pipeline after unreeling by disposing the first and second bending means at relative vertical heights to one another and to the pipeline coming off the reel such that an arc is imparted to the pipeline by said first roller means while the reel and said second roller means define the arc ends, the position of said first roller means being such that the arc imparted is the substantially equal opposing arc of the pipe unwrapped from the reel.

12. The method of claim 11 including the additional step of moving the roller means horizontally on the deck to facilitate achievement of the desired arc while minimizing loads on the pipeline.

13. The method of claim 11 including the additional step of reverse bending the pipeline in the horizontal plane as it unwraps from the reel so as to achieve a rectilinear configuration in the horizontal plane.

* * * * *